United States Patent [19]

Kohli et al.

[11] Patent Number: 4,645,803

[45] Date of Patent: Feb. 24, 1987

[54] CURABLE EPOXY RESIN COMPOSITIONS

[75] Inventors: Dalip K. Kohli, Norwalk; Michael M. Fisher, Ridgefield, both of Conn.

[73] Assignee: American Cyanamid Company, Stamford, Conn.

[21] Appl. No.: 584,700

[22] Filed: Feb. 29, 1984

[51] Int. Cl.[4] .................... C08G 59/50; C08L 63/00
[52] U.S. Cl. .................... 525/423; 523/435; 523/445; 523/468; 525/65; 525/113; 525/438; 525/453; 525/524; 528/98; 528/99
[58] Field of Search ............ 528/98, 99; 523/468, 523/201, 204, 215, 435, 400, 445, 458, 447, 459; 525/122, 65, 423, 113, 453, 438, 524

[56] References Cited

U.S. PATENT DOCUMENTS 3,755,253  8/1973  Rice .................................. 528/98
4,517,321  5/1985  Gardner et al. ................... 523/400

OTHER PUBLICATIONS

Chemical Abstracts 90, 39660y (1979).
Chemical Abstracts 91, 158760m (1979).
Lee & Neville, *Handbook of Epoxy Resins*, McGraw-Hill, N.Y., 1967, pp. 22-59 to 22-62.
May and Tanaka, *Epoxy Resins*, Marcel Dekker, Inc., New York, 1973, pp. 601-602.

*Primary Examiner*—Earl Nielsen
*Attorney, Agent, or Firm*—William H. Calnan

[57] ABSTRACT

New and improved heat curable compositions are disclosed comprising epoxidic resin(s) and aromatic ether-sulfone polyamines, alone or in combination with other diamine curing agents and/or curing catalysts alone, or in further combination with reinforcements, e.g., graphite fibers and, optionally modified with second resins. The cured neat resins and fiber resin matrix compositions exhibit high toughness, compression strength and short beam shear strength under dry, wet and hot/wet conditions.

9 Claims, 2 Drawing Figures

CURABLE EPOXY RESIN COMPOSITIONS

BACKGROUND OF THE INVENTION

The present invention relates to new and improved epoxy resin compositions. More particularly, it relates to curable epoxy resin compositions comprising reinforcing filaments and epoxy resin(s) combined with certain aromatic ether-sulfone polyamine curing agents.

Epoxy resin compositions are useful to encapsulate electronic components, and as structural adhesives, and the like. Reinforced epoxy resin composites having high strength to weight ratios have found extensive use in the aircraft and aerospace industries, and in other applications where strength, corrosion resistance and light weight are desirable. For instance, fiber resin matrix materials have replaced aluminum and other metals in primary and secondary structures of modern military and commercial aircraft. Sporting equipment such as tennis rackets and golf clubs have also adopted fiber resin materials successfully.

Epoxy resin compositions and fiber modifications are abundant. Since the advent of fiber resin matrix materials, much effort has been expended in improving their properties and characteristics, including the development of many different curing systems.

Amine and polyamine curing agents have received wide acceptance, but the toxicity, low solubility, high exotherm and variable curing rates associated with the most commonly used amines, such as m-phenylenediamine, 4,4'-diaminodiphenyl methane and 4,4'-diaminodiphenyl sulfone, has made further improvement desirable. In the case of aircraft structural applications, epoxy resins cured with available curing agents are either too brittle or do not have sufficient strength and stiffness under hot/wet conditions. It is disclosed in U.K. Pat. No. 1,182,377, which is incorporated herein by reference, that certain aromatic polyamines having the formula:

wherein R represents the radical formed after elimination of the hydroxyl group of a polyhydric aliphatic, cycloaliphatic or araliphatic alcohol, Ar represents an optionally substituted phenylene or naphthylene radical, R' represents hydrogen or an alkyl radical and n represents an integer from 2 to 10, are effective as curing agents for a variety of polyepoxides, and the resulting cured compositions are useful as films, moldings, coatings and glass-reinforced laminates. There is no indication in the properties presented in the U.K. Patent that the curing agents exemplified therein will produce the combination of toughness and strength under hot/wet conditions essential for use in the above-mentioned structural applications.

In U.S. Pat. No. 3,932,360, diamine cured polyurethane products are described, in which the diamines are of the formula, e.g., wherein n is an integer from 2 to 12. This U.S. Pat. No. 3,932,360 does not deal with curing compounds having more than one epoxide group per molecule.

In Gillhan et al, Organic Coatings and Applied Polymer Science Proceedings, Vol. 46, p. 592–598, March–April, 1982, polyepoxides cured with diamines of the immediately preceding formula (n is 3), are described.

In *Chemical Abstracts*, 90:39660y, bis(aminophenoxy) compounds, such as 4,4'-bis(3-aminophenoxy)diphenylsulfone, are disclosed to be useful crosslinking agents for bisphenol-A-epichlorohydrin copolymer resins and provide improved heat distortion temperature and improved flexibility to that cured epoxy resin, as compared with a similar composition cured with a diaminophenylmethane crosslinking agent.

In *Chemical Abstracts*, 91:158766t thermosetting resin laminates having good flexibility and machinability are disclosed which are, prepared by impregnating a glass textile with a thermocurable composition comprising an epoxy resin (ARALIDITE®8011, from Ciba-Geigy Corporation); a diamine of the formula:

where $Z^1$, $Z^2$ and $Z^3$ are O, S, $SO_2$, $CH_2$, CO, $CO_2$ or $C(CH_3)_2$ and 2-ethyl-4-methylimidazole; processing the impregnated fabric at 160° C. to form a prepreg; laying up several layers of prepregs and fusing at 170° C. and 90 Kg/cm² for 1½ hours.

It has now been discovered that new and improved curable epoxy resin compositions and fiber-resin matrix compositions are provided in the form of epoxy resin compositions comprising an epoxy resin(s) and a curing agent selected from certain aromatic ether-sulfone polyamine compounds. The present invention provides neat resn formulations which after curing exhibit improved flexural failure strength and strain, and improved hot/wet modulus. When the epoxy compositions of the present invention are cured with non-siliceous filaments to form reinforced composites, the composites exhibit improved interlaminar toughness, compression strength, and short beam shear strength under dry, wet or hot/wet conditions.

In the epoxy art, the term "epoxy resin" refers to a compound having more than one epoxy group per molecule, capable of being cured to a polymeric state.

SUMMARY OF THE INVENTION

It is an object of the present invention to provide improved epoxy resin compositions.

It is a further object of the present invention to provide a fiber matrix composition that affords satisfactory compression strength over known matrix formulations, especially under hot/wet conditions, and improved compression strength after impact.

These and other objects are accomplished herein by a composition comprising:
(a) non-siliceous reinforcing filaments; and
(b) a heat-curable epoxy resin composition comprising:
  (i) an epoxy resin(s) or combination of resin(s) having more than one epoxide group per molecule, and
  (ii) an amount effective to promote cure of said epoxy resin(s) of at least one amine-functional curing agent selected from those having the formulas:

alone, or optionally in combination with
(iii) at least one other polyamine curing agent; and/or
(iv) a curing catalyst.

In another aspect, the present invention contemplates fiber reinforced heat-curable epoxy resin compositions comprising:
(i) an epoxy resin(s) or combination of prepolymers having more than one epoxide group per molecule, and
(ii) an amount effective to promote cure of at least one amine-functional curing agent selected from those having the formulas:

alone, or optionally in combination with
(iii) at least one other polyamine curing agent; and/or
(iv) a curing catalyst.

It is among the features of this aspect of the invention to provide such compositions in filled and/or reinforced, e.g., glass fiber reinforced embodiments, which are useful as prepregs, for example, to make laminates and other structural shapes in accordance with procedures known in this art.

In another preferred aspect, the present invention provides compositions of epoxy resins and the above-mentioned diamine curing agents which also include a second resin in an amount sufficient to impart improvements in mechanical properties, especially toughness, while preserving substantial resistance to failure under hot/wet conditions. Such resins can be present homogenously and also in the form known as interpenetrating polymer networks.

Particularly useful in this aspect are polyether resins derived from bisphenol A and epichlorohydrin, and having repeating units of the formula:

and polyetherimide resins derived from the reaction product of bisphenol-A and a substituted phthalic anhydride, subsequently reacted with m-phenylenediamine and containing units of the formula:

wherein n in each is a number sufficient to provide a molecular weight in the range of 5,000 to 60,000. Amounts of 5 to 30, preferably 10 to 20 parts by weight per 100 parts by weight of epoxy resin(s) can be used.

Such polymers are available commercially, respectively, from Union Carbide Co., Danbury. CT, U.S.A., under the tradename PKHH resin and from General Electric Company, Fairfield, CT, U.S.A., under the tradename, ULTEM resin. Their use in epoxy systems is described in the abovementioned Ser. No. 518,879, filed Aug. 1, 1983, assigned to the same assignee as the present invention.

Other resins which can be used as thermoplastic modifiers include reactive and non-reactive butadiene-styrene-acrylonitrile core-shell modifiers, polyurethanes, nylons, carboxylated acrylonitrile-butadiene elastomers, e.g., those described in the above-mentioned U.S. Pat. No. 3,894,113, and many others. They will, in general, have molecular weights in the range of 5,000 to 60,000, and will be used in amounts set forth above.

Generally, and without limitation, the aromatic ether-sulfone polyamine curing agent or agents are employed in an amount of from about 25 to about 120 parts by weight, based upon 100 parts by weight of the epoxidic prepolymer or prepolymer mixture.

In addition to the ether-sulfone diamine curing agents of the present invention, other diamine curing agents and/or curing catalysts may be employed in combination therewith. Suitable diamine curing agents for use in combination with the aromatic ether-sulfone polyamine curing agents of the present invention include, for example, m-phenylenediamine, 4,4'-diaminodiphenyl methane, 4,4'-diaminodiphenylsulfone and certain bis-(aminobenzoate)alkylene compounds and N-methylated bis(aminobenzoate)alkylene compounds to be more fully described below. The optional secondary diamine curing agents may generally and without limitation be employed in admixtures with the aromatic ether-sulfone diamines in weight ratios of from about 1:5 to about 5:1, aromatic ether-sulfone diamine to optional diamine, respectively. When a combination of curing agents are used as component (b), the relative proportions of curing agents (b)(ii) and (b)(iii) to epoxidic prepolymer or prepolymers (b)(i) in the curable composition will be the same as identified above, namely, from about 25 to about 120 parts by weight of curing agents (b)(ii) and (b)(iii), based upon 100 parts by weight of epoxidic resin(s), component (b)(i).

Illustrative curing catalysts which may optionally be employed as component (b)(iv) with the aromatic ether-sulfone diamine curing agents of the present invention, whether present alone, or in admixture with the other optional diamines mentioned above, include for example, boron trifluoride—organic amine adducts and the reaction product of toluene-2,4-diisocyanate and dimethylamine, as well as other known curing catalysts or cure accelerators known to those skilled in this art. Generally and without limitation the curing catalyst is added in an amount of from about 0.1 to about 5.0% by weight of the total weight of the epoxidic resin(s) and curing agent(s), to accelerate curing.

In an especially preferred embodiment, the thermocurable composition comprises:

(a) an N,N,N',N'-tetraglycidyl-4,4'-diaminodiphenyl methane, in intimate admixture with
(b) 4,4'-bis(4-aminophenoxyphenyl)sulfone, alone or in combination with a second diamine curing agent alone, or in further combination with graphite fiber or graphite fabric reinforcement.

The new and improved neat reins of the present invention exhibit improved toughness and hot/wet modulus properties, and prepregs and laminates prepared therewith exhibit significant improvements in composite properties such as compression strength and short beam shear strength.

Other objects and advantages of the present invention will become apparent from the following detailed description of the invention and illustrative working Examples, taken in conjunction with the formal drawings in which:

DETAILED DESCRIPTION OF THE INVENTION

In general, the resin compositions of the present invention are prepared by mixing the polyepoxide compounds with the polyamines of the above-mentioned formulas in an amount sufficient to provide an equivalent ratio of epoxy groups to amine groups of from about 1:0.5 to about 1:2.5. The admixture is optionally heated, for example to a temperature of between about 30° C. and 300° C. and preferably to a temperature of about 70° C. to about 125° C., until a melt is obtained. The melt can then be poured into a mold and reacted, for example, for two hours at approximately 135° C. and then for three hours at approximately 180° C., to form moldings showing outstanding mechanical and electrical properties.

Fillers, pigments, dyes, reinforcements, such as glass fibers or woven cloths, plasticizers, and mixtures thereof, may be added to the epoxy resin—polyamine composition before the reaction in order to modify ultimate properties, in known ways. Applications can also be made by trowelling, brush coating, immersion or dip coating, spraying and other conventional methods.

The fiber resin matrix compositions according to the present invention can be prepared by embedding filaments, e.g., glass fibers and/or non-siliceous filaments in a curable resin composition to form a fiber resin matrix which can be manipulated and cured to a solid composite. Particular selection of the filament material, epoxy resin(s) and curing agent, as well as including optional ingredient such as fillers, dyes, catalysts, processing aids, etc., can give a range of curable compositions heretofore unknown in the art and exhibiting improved physical properties over known materials.

Glass filaments useful herein are well known. The non-siliceous filament component may be of any non-glass, non-silicon dioxide-containing material which improves the strength or other physical properties of the curable epoxy resin component, more fully described below. Such filaments include, but are not limited to, filaments comprised of carbon, graphite, silicon carbide, boron, aramid, polyester, polyamide, rayon, polybenzimidazole, polybenzothiazole, metal-coated such filaments, for example nickel-coated and/or silver-coated graphite fibers and filaments, or combinations of such filaments. Fibers (woven or non-woven), tows or mats of such filaments, or tapes (unwoven, flat bundles of the unidirectional filaments) may be employed as desired. In applications demanding high stiffness-to-weight ratio or shear strength, carbon fibers, graphite filaments, polyaramid filaments or nickel-plated graphite filaments, as disclosed in assignee's copending application Ser. No. 358,637 are most preferred.

The epxoy resins suitable for use in the present invention are compounds having more than one epoxide group per molecule available for reaction with the primary polyamine curing agents of the present invention. Such epoxy resin(s) include but are not limited to polyglycidyl ethers of polyvalent phenols, for example pyrocatechol; resorcinol, hydroquinone; 4,4'-dihydroxydiphenyl methane; 4,4'-dihydroxy-3,3'-dimethyldiphenyl methane; 4,4'-dihydroxydiphenyl dimethyl methane; 4,4'-dihydroxydiphenyl methyl methane; 4,4'-dihydroxydiphenyl cyclohexane; 4,4'-dihydroxy-3,3'-dimethyldiphenyl propane; 4,4'-dihydroxydiphenyl sulfone; or tris(4-hydroxyphenyl)methane; polyglycidyl ethers of the chlorination and bromination products of the abovementioned diphenols; polyglycidyl ethers of novolacs (i.e., reaction products of monohydric or polyhydric phenols with aldehydes, formaldehyde in particular, in the presence of acid catalyst); polyglycidyl ethers of diphenols obtained by esterifying 2 mols of the sodium salt of an aromatic hydrocarboxylic acid with 1 mol. of a dihaloalkane or dihalogen dialkyl ether (U.K. Pat. No. 1,017,612); and polyglycidyl ethers of polyphenols obtained by condensing phenols and long-chain halogen paraffins containing at least two halogen atoms (U.K. Pat. No. 1,024,288).

Other suitable compounds include polyepoxy compounds based on aromatic amines and epichlorohydrin, for example N,N'-diglycidyl-aniline; N,N'-dimethyl-N'N'-diglycidyl-4,4'-diaminodiphenyl methane; N,N,N',N'-tetraglycidyl-4,4'-diaminodiphenyl methane; and N-diglycidyl-4-aminophenyl glycidyl ether. Special mention is made of N,N,N',N'-tetraglycidyl-1,3-propylene bis-4-aminobenzoate.

Preferred polyepoxy compounds of this latter type are prepared by reacting the aromatic ether-sulfone diamines of the present invention with epichlorohydrin, to form epoxy resin(s) of the formulas:

and wherein x is an integer from 1 to 4, available commercially (where x=1) as ARALDITE ® MY-720 (Ciba-Geigy);

Glycidyl esters and/or epoxycyclohexyl esters of aromatic, aliphatic and cycloaliphatic polycarboxylic acids, for example phthalic acid diglycidyl esters and adipic diglycidyl ester and glycidyl esters of reaction products of 1 mole of an aromatic or cycloaliphatic dicarboxylic acid anhydride and ½ mole of a diol or 1/n mole of a polyol with n hydroxyl groups, or hexahydrophthalic acid diglycidyl esters, optionally substituted by methyl groups, are also suitable.

Glycidyl ethers of polyhydric alcohols, for example of 1,4-butanediol; 1,4-butanediol; glycerol; 1,1,1-trimethylol propane; pentaerythritol and polyethylene glycols may also be used. Triglycidyl isocyanurate; and polyglycidyl thioethers of polyvalent thiols, for example, of bis(mercaptomethylbenzene) and diglycidyltrimethylene sulfone, are also suitable.

Preferably the epoxy resin(s) component will be selected from compounds having the idealized formula:

and halogen and alkyl substituted derivatives of such compounds, wherein c is 2, 3 or 4 and equal to the valence of Q; Q is a divalent, trivalent or tetravalent radical; G is —O—, —NR'— or R' is hydrogen or allyl; and d is 1 or 2 depending on the valence of G.

The most preferred epoxy compounds will include the following:

available commercially as XD 7342 (Dow Chemical);

available commercially as DER 331 (Dow Chemical) or EPON ® (Shell);

available commercially as EPON ® 1031 (Shell);

wherein y is 1 or 2, X is —O— or —NH, $R^3$ is H or $CH_3$ and n is 2 to 8.

Compounds in which X is —O— are available as a mixture under the tradename DEN-438 from Dow Chemical Company.

Also preferred are triglycidyl ethers of meta- and para-hyroxyaniline, e.g., represented by the formula:

These are available under the tradename ARALDITE ® 0500, 0510 from Ciba-Geigy.

More particularly, the aromatic ether-sulfone polyamine curing agents for use in the present invention are generally represented by the formulas:

Preferred aromatic ether-sulfone diamine curing agents in accordance with the present invention are 4,4'-bis(3-aminophenoxyphenyl)sulfone; 4,4'-bis(4-aminophenoxyphenyl)sulfone, as well as, the long chain ether-sulfone diamines defined by the latter formula.

The new and improved aromatic ether-sulfone polyamine curing agents for use in the present invention may be simply prepared, for example, by reacting the corresponding m- or p-aminophenol with 4,4'-dichlorodiphenylsulfone in the presence of sodium hydroxide in dimethylsulfoxide. The reaction may be summarized with reference to certain preferred starting materials as follows:

In accordance with the present invention, the epoxide resin(s) or mixtures of prepolymers are cured with certain aromatic ether-sulfone polyamines alone, or in combination with other polyamine curing agents to provide thermocurable epoxy resin compositions exhibiting improved strength and toughness and improved hot/wet modulus properties over prior art compositions.

The long chain ether-sulfone diamine curing agents of this invention may be prepared in a similar manner, except that bisphenol-A is added with the other starting materials, with each of the starting materials being present in carefully specified amounts. Further details regarding the synthesis of the aromatic ether-sulfone polyamine curing agents for use herein are described in Schramm et al, *Liebigs Am. Chem.*, 740, 169 (1970).

As has been mentioned above, the aromatic ether-sulfone diamine curing agents of the present invention may be used individually, or mixtures of the ether-sulfone diamines may be used, or optionally, the ether-sulfone diamines may be used in combination with other diamine curing agents to cure epoxidic resin(s) (b)(i). Other diamines, such as methylene dianiline, m-phenylenediamine, 4,4'-diaminodiphenyl methane, and 4,4'-diaminodiphenyl sulfone, to name but a few, may be used as additional curing agents for this purpose. Other diamines which are preferred are bis(aminobenzoate) compounds generally having the formula:

wherein a is 2 or 3, R is hydrogen, alkyl, or aryl, and X is a divalent or trivalent organic hydrocarbon, hetero-interrupted hydrocarbon, or substituted hydrocarbon radical, or One preferred optional bis(aminobenzoate) compound is a compound having the above formula wherein X is propylene, R is hydrogen, and a is 2, namely, trimethylene bis(p-aminobenzoate), which is commercially available under the tradename POLACURE® from the Polaroid Corporation.

The bis(aminobenzoate) compounds of the above formula may be prepared from corresponding starting materials, e.g., nitro compounds, by reduction, for example, according to the methods described in U.K. Pat. No. 1,182,377. In addition, commonly assigned U.S. application, Ser. No. 518,863, filed Aug. 1, 1983, shows an elegant method for N-methylation, using succinimide and formaldehyde with the primary amine, followed by reductive cleavage.

The especially preferred optional curing agents for use herein are bis(aminobenzoate) compounds according to the above formula in which R is hydrogen, $C_1$-$C_3$ alkyl, or phenyl, and X is a divalent or trivalent radical of valence a, selected either from (1) a divalent group consisting of —$(CH_2)_y$—, wherein y is an integer from 2 to 12, —($CH_2CH_2OCH_2CH_2OCH_2CH_2$)—, or (2) a trivalent group consisting of and —$(CH_2)_n$—CH—$(CH_2)_m$—, wherein n and m are the same or different integers from 1 to 4.

More preferred optional curing agents are the following:

wherein z is an integer of from 2 to 12, preferably 2 to 6, wherein z is an integer from 2 to 12, preferably 2 to 6, wherein Y is —$CH_2CH_2OCH_2CH_2OCH_2CH_2$—, wherein z is an integer of from 2 to 12, preferably 2 to 6.

These latter preferred bis(aminobenzoate) curing agents and their preparation are more fully described in U.S. Ser. No. 518,872, filed Aug. 1, 1983, assigned to the same assignee as the present invention, which disclosure is specifically incorporated herein by reference.

The new and improved epoxy resin compositions of the present invention may be used as neat resins, alone or in admixture with reinforcing fibers, fillers, pigments, dyes, curing catalysts and other conventional additives and processing agents.

In an alternate aspect, the new and improved epoxy resin compositions are employed to form fiber-matrix compositions.

Figure 1:
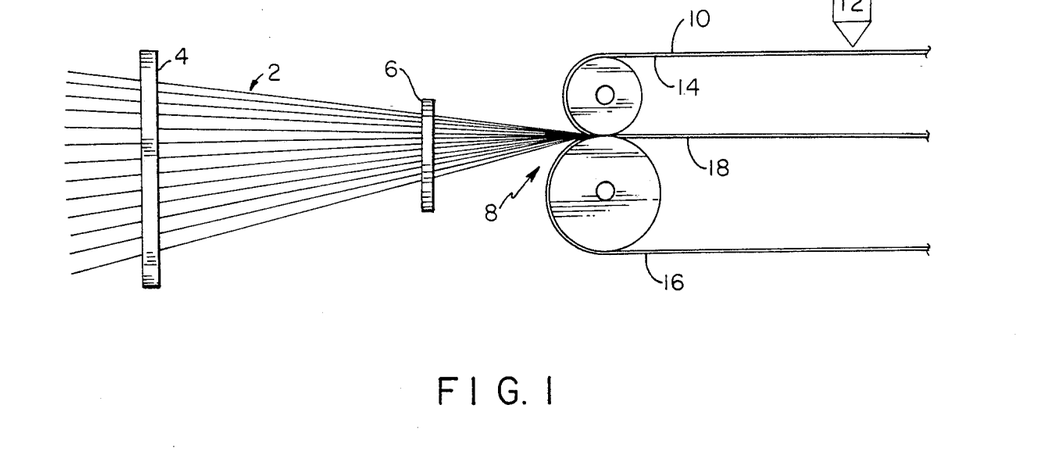
FIG. 1 is a schematic of one method for preparing a fiber resin matrix prepreg tape of the present invention.

More particularly, one method of forming the fiber matrix composition of the present invention is illustrated in the drawings. As seen in FIG. 1, the basic fiber matrix material is produced by delivering fiber 2 through conventional eyeboards 4 and 6 to a pressure roller assembly 8. The resin composition is coated in a layer 10 from a conventional film coating applicator 12 onto a substrate such as release paper 14 and passed through the pressure roller assembly 8. Release paper 16 is also delivered to the pressure roller assembly 8.

The pressure rollers 8 are set at a temperature and pressure for imbedding the fibers 2 in the resin layer 10 to form a fiber matrix composition 18. Practice has taught that a temperature in the range of 190° F. and pressures of one thousand pounds over fifteen inch centers are suitable for producing fiber resin prepreg tape 18.

The fibers 2, the substrate 14 with resin layer 10 and the release paper 16 are delivered to the pressure rollers 8 and passed therethrough at the rate of 5–20 feet/minute.

The feed of fiber 2 and resin layer 10 to the pressure rollers 8 is selected to produce a fiber matrix of about twenty to sixty weight percent resin and about eighty to forty weight percent fiber. For example, one hundred twenty spools of 6K carbon fibers are delivered within a twelve inch width to the pressure rollers 8 with a layer of resin 0.009 to 0.0013 pounds per square foot. The resulting fiber resin matrix 18 results in a generally parallel array of fibers, shown by FIG. 2.

Fillers, pigments, dyes, curing catalysts such as those described above and other such conventional additives and processing aids may be added to the fiber matrix compositions of the invention before curing to influence the properties of the final resin composite. In addition, polymeric additives such as the polyether resins, the polyetherimide resins and the butadiene-styrene-acrylonitrile coreshell polymers and the like, mentioned above, can be included for their known effects on polymer properties.

The new and improved epoxy resin compositions of the present invention provide thermally curable neat resin compositions which exhibit an increase in flexural failure strength and strain, and improved toughness and improved hot/wet modulus. The epoxy resin compositions of the present invention are useful in fiber resin matrix compositions to provide advanced composite materials exhibiting improved compression strength and improved toughness under dry, wet or hot/wet conditions. The compositions of the present invention are well suited for use as improved primary structures in aircraft and other structural applications, as well as adhesives and in electrical uses, such as potting compounds and printed circuit board substrates.

In order that those skilled in this art may better understand how the present invention may be practiced, the following examples are provided by way of illustration and not by way of limitation.

EXAMPLES 1–7

The following procedure was used to prepare and cure neat resin compositions: the epoxide resin(s) and the polyamine component were mixed at 125° C. for 5 minutes, and cooled to 100° C., the catalyst, if any, was mixed in, and the mixture was degassed for 10 minutes. The liquid resin was then poured into a mold and cured for 2 hours at 135° C. and for 3 hours at 177° C. Properties were determined by the following procedures: The flexural test is described in ASTM D-790, Method I. Dynamic Mechanical Analyzer, and Tg was defined as the temperature at which the loss tangent, tan δ, is a maximum. ASTM D4065 test method covers this type of $T_g$ measurement. Conditioning before testing is described by the phrases "wet" and "dry". "Wet" refers to conditioning by immersion of the sample in distilled water for the times and temperatures stated, prior to testing at 93° C. In the following Table 1, the 4,4'-bis(4-aminophenoxyphenyl)sulfone curing agent of this invention, i.e.

is designated, "p-ES"; the 4,4'-bis(3-aminophenoxyphenyl)sulfone, i.e., is designated, "m-ES"; the long chain ether sulfone diamine of this invention, is designated, "m-LES"; and long chain ether sulfone diamine, is designated, "p-LES".

The formulations prepared and the test results obtained are set forth in Table 1 as follows:

The following neat resin formulations was prepared and tested in accordance with the procedures of Examples 1-7. The materials used and the results obtained are set forth in TABLE 2 as follows:

TABLE 1

FLEXURAL PROPERTIES OF IMPROVED THERMOCURABLE EPOXY RESIN COMPOSITION

| | A* | 1 | 2 | 3 | 4 | 5 | 6 | 7 | 8 |
|---|---|---|---|---|---|---|---|---|---|
| COMPONENTS (pbw) | | | | | | | | | |
| N,N,N',N'—tetraglycidyl-4,4'-diamino diphenyl methane[1] | 100 | 100 | 100 | 100 | 100 | 100 | 100 | 100 | 100 |
| 4,4'-bis(aminophenyl) sulfone | 39.24 | — | — | — | — | — | — | — | — |
| p-ES | — | 86.5 | 73.5 | 65 | 56.2 | — | — | — | — |
| m-ES | — | — | — | — | — | 50 | 32 | — | — |
| m-LES | — | — | — | — | — | — | — | 118 | — |
| p-LES | — | — | — | — | — | — | — | — | 118 |
| trimethylene bis(p-amino benzoate) | — | — | — | — | — | 25 | 47 | — | — |
| PROPERTIES | | | | | | | | | |
| Tg, °C. | 280 | 265 | 260 | 250 | 250 | 265 | 260 | 217 | 204 |
| MODULUS (MSI) | | | | | | | | | |
| dry | 0.59 | 0.55 | 0.57 | 0.56 | 0.57 | 0.59 | 0.49 | 0.51 | 0.54 |
| wet | 0.35 | 0.42 | 0.42 | 0.42 | 0.44 | 0.38 | 0.35 | 0.45 | 0.43 |
| STRENGTH (KSI) | | | | | | | | | |
| dry | 18.0 | 21.7 | 21.6 | 21.2 | 22.3 | 21.6 | 23 | 17 ± 3.0 | 17 ± 3.8 |
| wet | 11.5 | 14.3 | 14.4 | 14.6 | 12.5 | — | — | — | — |
| FAILURE STRAIN, % | | | | | | | | | |
| dry | 3.0 | 4.4 | 4.2 | 4.1 | 4.2 | 4.9 | 5.9 | 3.4 ± 0.7 | 3.2 ± 0.8 |
| wet | 4.5 | 4.1 | 5.1 | 4.6 | 3.2 | — | — | — | — |
| % H2O | 4.34 | 3.58 | 3.49 | 3.48 | 3.49 | — | — | — | — |
| Work-to-Break in.-lbs/in.[3] | — | — | — | — | — | — | — | 320 ± 120 | 310 ± 140 |

The data demonstrate that when the compositions of this invention comprising the aromatic ether-sulfone curing agents of the present invention, alone or in admixture with other optional curing agents, are cured and tested, in comparison with a standard curing agent, para-diaminodiphenyl sulfone, flexural strength is increased, strain is increased, and wet modulus in increased. In addition, Tg is reduced by only an average 10%. The advantages of the compositions of this invention are thus shown.

EXAMPLES 9-10

These Examples illustrate the improved properties of neat resins obtained by using the aromatic ether-sulfone curing agents of the present invention, wherein the epoxidic resin(s) employed is a tetraglycidyl reaction product of epichlorohydrin and an aromatic sulfone diamine compound.

TABLE 2

NEW AND IMPROVED CURABLE COMPOSITIONS BASED ON SULFONE EPOXIDIC RESIN(S) AND ETHER SULFONE CURING AGENTS

| | 9 | 10 |
|---|---|---|
| COMPONENTS (pbw) | | |
| N,N,N',N'—tetraglycidyl-bis (4-aminophenyl)sulfone[1] | 100 | — |
| N,N,N',N'—tetraglycidyl-bis (3-aminophenoxyphenyl)sulfone[2] | — | 100 |
| m-ES[3] | 70.4 | 39 |
| PROPERTIES | | |
| Tg, °C. | 247 | 248 |
| MODULUS (MSI) | | |
| dry | 0.70 | 0.55 |
| wet | 0.46 | 0.39 |
| STRENGTH (KSI) | | |
| dry | 20.1 | 21.0 |
| Failure Strain, % | 3.1 | 3.4 |

TABLE 2-continued
NEW AND IMPROVED CURABLE COMPOSITIONS BASED ON SULFONE EPOXIDIC RESIN(S) AND ETHER SULFONE CURING AGENTS

|  | 9 | 10 |
|---|---|---|
| Work-to-Break, in.-lbs./in.[3] | 320 ± 40 | 330 ± 160 |

[3]See Examples 1–7.

Examples 9 and 10 demonstrate that the new and improved epoxy resin compositions of the present invention comprising sulfone-containing epoxidic resin(s) cured with the an aromatic ether-sulfone curing agent of this invention, provide epoxy compositions exhibiting excellent flexural modulus and strength properties under both dry and wet conditions, with only a minor effect on Tg.

EXAMPLE 11

This example illustrates the new and improved fiber-resin matrix compositions in accordance with the present invention.

Figure 2:
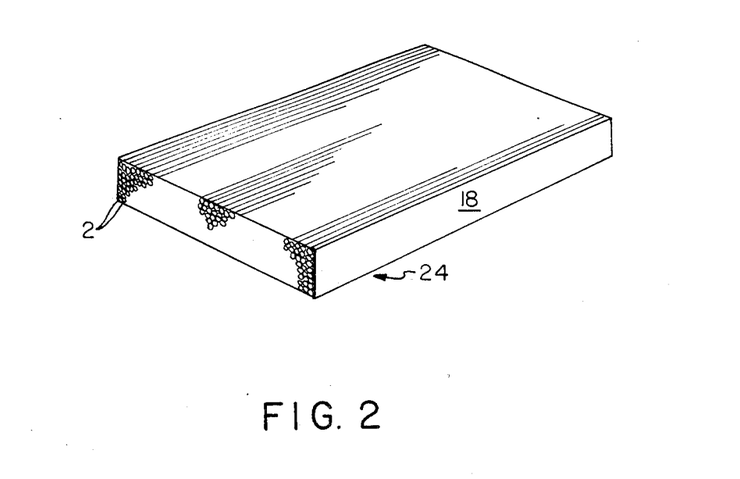
FIG. 2 is an enlarged cross-sectional view of a strip of the fiber resin matrix prepreg tape of the invention.

Using an apparatus shown generally in FIG. 1, prepreg tapes of the structure shown generally in FIG. 2 were prepared. The fiber employed was Celion ® 3K 70P fabric and the resin matrix formulations employed are outlined in Table 3 below.

Sample laminates were prepared for testing by laying up 12 plies of the prepreg tape and fusing the prepreg layers by pressing at about 170° C. and 90 kg/cm² for a period of 90 minutes. Compressive strength of the laminates was measured on a modified ASTM D 695 specimen described in D. H. Woolsencraft et al, *Composites*, October, 1981, pages 275–280. Short Beam Shear Strength was measured in accordance with ASTM test method D-2344-76 on six inch bars of 0.25 inch thickness, by applying a centered load at the middle portion of a test sample loosely mounted at its ends. The load was applied at a constant rate and load at break was noted. The resin formulations used and the laminate properties obtained are set forth in TABLE 3, as follows:

TABLE 3
MECHANICAL PROPERTIES OF GRAPHITE FIBER - EPOXY RESIN COMPOSITE 12-PLY LAMINATES

|  | B* | 11 |
|---|---|---|
| COMPOSITION (pbw) |  |  |
| N,N,N',N'—tetra(glycidyl-4,4'-diaminodiphenyl)methane[1] | 80.0 | 80.0 |
| Epoxidized o-cresol novolac resin[2] | 20.0 | 20.0 |
| 4,4'-bis(3-aminophenoxyphenyl) sulfone | — | 61.0 |
| Diaminodiphenylsulfone | 35.0 | — |
| LAMINATE PROPERTIES |  |  |
| Compression Strength, KSI |  |  |
| Room temperature, dry | 84 ± 8.5 | 93.2 ± 4.3 |
| 93° C., Dry | 81.8 ± 6.9 | 87.7 ± 9.4 |
| 93° C., Wet (14 day immersion) | 67.4 ± 7.2 | 71.5 ± 5.0 |
| SHORT BEAM SHEAR STRENGTH, KSI |  |  |
| Room temperature, dry | 9.23 ± 0.60 | 11.2 ± 1.34 |
| 93° C., dry | 9.16 ± 0.28 | 9.68 ± 0.10 |
| 93° C., wet (14 days immersion) | 6.65 | 6.48 ± 0.39 |

*State-of-the-art composites.
[1]ARALDITE ® MY-720, Ciba-Geigy Corporation.
[2]ECN ®-1273, Dow Chemical Company.

These data illustrate the improved results in compression strength in dry, hot/dry and hot/wet conditions obtained with the new and improved fiber-resin composites of the present invention as compared with a prior art composite system. The fiber resin composite of the present invention also exhibited improved short beam shear strength under dry and hot/dry conditions and comparable short beam shear strength under hot/wet conditions as compared with the prior art composite material.

EXAMPLE 12

A fiber resin matrix formulations was prepared from the following materials:
Component (a)—Celion ® 6K high strain stain graphite fiber
Component (b)(i)—ARALDITE ® MY 720 EPON ® 1031 (see formulas, supra.)
Curing agent (b)(ii)—M-ES
Optional Curing Agent (b)(iii)—POLACURE ® M 740, see TABLE 1, supra.
Catalyst (b)(iv)—toluene-2,4-diisocyanate reaction product with dimethylamine.
Filler—fumed colloidal silica (CAB-O-SIL ® M-5, Cabot Corp.).

Using an apparatus shown generally in FIG. 1, prepreg tapes of the structures shown generally in FIG. 2 were prepared:

|  | 12 |
|---|---|
| 28% Resin Miture (pbw) |  |
| N,N,N',N'—tetraglycidyl-4,4'-diaminodiphenyl methane | 80 |
| tetraglycidoxy tetraphenylethane | 20 |
| 4,4'-bis(3-aminophenoxyphenyl) sulfone | 18 |
| trimethylene-bis-(p-aminobenzoate) | 30.5 |
| Catalyst | 6 |
| Filler | 1 |
| 72% Filament (pbw) |  |
| (6K graphite fibers having a strain to failure of about 1.5%) |  |

These samples were cured and compared against commercial epoxy resin matrixes. The sheets of resin involved were as follows:
Uni-Comp: 8 sheets [0]
Quasi-Comp: 16 sheets ([(±45/0/90)₂]₂
The compressive strength was measured on a modified ASTM D695 specimen described in D. H. Woolsencraft et al, Composites, October, 1981, pages 275–280. Both unidirectional and quasi isotropic laminates were tested by this method. Compressive strength after impact was measured as described in B. A. Byers, NASA Report No. CR 159293, August, 1980. This property is tested by subjecting a cured laminate specimen to 1500 in.-lb. per inch of nominal thickness impact with a 0.62 diameter spherical tip impacter while supported by a rigid base (e.g., 3×5 in. steel cutout). The panel is then tested in compression. The results are set forth in Table 4, as follows:

TABLE 4

| PROPERTIES | LAMINATE PROPERTIES | |
|---|---|---|
| | 8-PLY UNIDIRECTIONAL | 16-PLY QUASI-ISOTROPIC |
| Compressive Strength (KSI) | | |
| at 23° C. dry | 211 | 92 |
| at 93° C. | | |
| dry | 197 ± 19 | 85 ± 5 |
| wet | 168 ± 6 | 77 ± 4 |
| at 132° C. | | |
| dry | 151 ± 15 | 72 ± 3 |
| wet | 67 ± 5 | 49 ± 3 |
| at 177° C. dry | 41 ± 2 | 29 ± 2 |
| Compressive Strength After Impact 36-Ply (KSI/1500 in.-lbs/in.) | — | 31.2 ± 3.1 |
| Fracture Toughnes, $G_{1C}$ (in.-lbs./in.$^2$) | — | 1.4 |

As shown in TABLE 4, reinforced compositions according to the present invention exhibit excellent compression strength after impact and excellent compression strength under both hot and wet conditions.

Each of the above-mentioned patents, applications and publications are specifically incorporated herein by reference. Although the present has been described with reference to certain preferred embodiments, modifications or changes may be made therein by those skilled in this art. For example, instead of N,N,N',N'-tetra(glycidyl-4,4'-diaminodiphenyl)methane being used as the epoxy resin(s) component, the diglycidyl ethers of 4,4'-dihydroxy 3,3'-dimethylphenyl propane or 4,4'-dihydroxydiphenyl sulfone may be employed. Instead of graphite fabric being used, in the fiber-matrix composite compositions, silver or nickel plated graphite fibers, glass fibers and cloths or aluminum fibers may be employed as the fiber component. All such obvious modifications are within the scope and spirit of the present invention as defined by the appended claims.

What is claimed is:

1. A fiber resin matrix composition which exhibits, upon curing, improved interlaminar toughness, compression strength and short beam shear strength under dry, wet and hot/wet conditions, said composition comprised of:
   (a) non-siliceous reinforcing filaments; and
   (b) a heat-curable epoxy resin composition comprising:
      (i) an epoxy resin or combination of epoxy resins having more than one epoxide group per molecule, and
      (ii) an amount effective to promote cure of said epoxy resin of at least one amine-functional curing agent selected from those having the formulas:

alone, or optionally in combination with;
   (iii) at least one other polyamine curing agent; and/or
   (iv) a curing catalyst.

2. A fiber resin matrix composition which exhibits, upon curing, improved interlaminar toughness, compression strength and short beam shear strength under dry, wet and hot/wet conditions, said composition comprised of:
   (a) non-siliceous reinforcing filaments;
   (b) a heat-curable epoxy resin composition comprising:
      (i) an epoxy resin or combination of epoxy resins, and
      (ii) an amount effective to promote cure of said epoxy resin of at least one amine functional curing agent selected from those having the formulas:

alone or optionally in combination with;
   (iii) at least one other polyamine curing agent; and/or
   (iv) a curing catalyst;
   said composition further comprising
   (c) a second homogeneous or heterogeneous polymer resin component blended and alloyed with components (a), (b)(i) and (b)(ii) in an amount sufficient to enhance toughness and resistance to failure under hot/wet stress conditions in composites produced from said compositions.

3. A composition as recited in claim 2, wherein component (c) is present in an amount from 1 to about 30 parts by weight based upon 100 parts by weight of epoxy resin.

4. A composition as in claim 2, wherein said second resin component (c) is a polyether resin including repeating units of the formula:

wherein n is a number sufficient to provide a molecular weight of 5,000 to 60,000.

5. A composition as defined in claim 2, wherein said second resin, component (c) is a polyetherimide resin including repeating units of the formula:

wherein n is a number sufficient to provide a molecular weight of 5,000 to 60,000.

6. A composition as defined in claim 2, wherein said second resin, component (c), is a reactive or non-reactive modifying resin selected from the group consisting of butadiene-styrene-acrylonitrile core-shell resins, polyurethane resins, nylon resins and carboxylated acrylonitrile-butadiene elastomer resins.

7. A heat-curable epoxy resin composition comprising a reinforcement and
   (i) an epoxy resin or combination of epoxy resin, and
   (ii) an amount effective to promote cure of said epoxy resin of at least one amine-functional curing agent selected from those having the formula:

alone, or optionally in combination with;
(iii) at least one other polyamine curing agent; and/or
(iv) a curing catalyst.

8. A composition as in claim 7 wherein said reinforcement comprises reinforcing filaments.

9. A composition as in claim 8 wherein the reinforcing filaments are non-siliceous filaments.

* * * * *